US006507648B1

United States Patent
Golka et al.

(10) Patent No.: US 6,507,648 B1
(45) Date of Patent: Jan. 14, 2003

(54) METHOD AND APPARATUS FOR PRIORITIZING VOICE AND DATA IN A CIRCUIT-SWITCHED NETWORK

(75) Inventors: Kevin W. Golka, Kanata (CA); John R. Donak, Kanata (CA); Lorne A. Porter, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/219,496

(22) Filed: Dec. 23, 1998

(51) Int. Cl.$^7$ .............................. H04J 3/16; H04M 3/00; H04M 7/00
(52) U.S. Cl. .................. 379/221.07; 370/468; 379/232; 379/243; 379/272
(58) Field of Search ....................... 379/221.06, 221.07, 379/219, 220.01, 221.01, 232, 242, 243, 271, 272, 273; 370/468

(56) References Cited

U.S. PATENT DOCUMENTS 5,537,469 A * 7/1996 Beniston et al. ........ 379/221.07

FOREIGN PATENT DOCUMENTS

JP          01-157656 A  *  6/1989  ............. H04M/3/20

* cited by examiner

*Primary Examiner*—Harry S. Hong
(74) *Attorney, Agent, or Firm*—Kevin L. Smith (57) ABSTRACT

The invention is a novel method of processing incoming and outgoing call requests by a switching unit such as a KSU, PBX or PC server. Each established circuit and each call request is associated with a priority. For an outgoing call request, if an available external bandwidth channel of the appropriate type is found, then a circuit is established at once. However, if there is no available external bandwidth channel of the appropriate type, then the priority of the outgoing call request is checked against the priority of the established circuits. If a lower-priority circuit is found, then that circuit is torn down and a new circuit is established between the internal bandwidth channel carrying the outgoing call request and the external bandwidth channel formerly occupying the established circuit that was torn down. In the case of an incoming call request, a destination terminal device and associated internal bandwidth channels will be specified and availability thereof is verified. If all the bandwidth channels are occupied and if the incoming call request has a higher priority than at least one established circuit involving the destination terminal device, then the existing circuit is torn down and a new one is established between that internal bandwidth channel and the external bandwidth channel carrying the incoming call request.

22 Claims, 5 Drawing Sheets

| EXTERNAL LINE POOL | EXTERNAL BANDWIDTH CHANNEL | INTERNAL BANDWIDTH CHANNEL | CALL PRIORITY |
|---|---|---|---|
| POTS | 1 | | |
| | ... | | |
| | 8 | | |
| ISDN-PR | 1 | | |
| | ... | | |
| | 8 | | |
| ISDN-BR | 1 | | |
| | 2 | | |
| T1 | 1 | | |
| | ... | | |
| | 8 | | |

METHOD AND APPARATUS FOR PRIORITIZING VOICE AND DATA IN A CIRCUIT-SWITCHED NETWORK

FIELD OF THE INVENTION

The present invention relates to switching units for use in circuit-switched networks and particularly to the processing of incoming and outgoing call requests of varying priorities at a switching unit.

BACKGROUND OF THE INVENTION

In the majority of business establishments connected to a public or private switched telephone network, the number of potential users of data and telephony services is usually greater than the number of available external interfaces to the network. To manage the allocation of bandwidth on the external interfaces (e.g., external telephone lines) to internal users, businesses usually rely on the use of a switching unit such as a private branch exchange (PBX) or a key system unit (KSU).

The heart of a PBX or KSU is a switch matrix for establishing one-to-one connections between a plurality of bandwidth channels on a number of external lines and, usually, an even greater plurality of bandwidth channels on a number of internal lines. In some cases, internal lines are directly connected to individual terminal devices such as digital telephones, personal computers and point-of-sale terminal adapters (e.g., credit card readers). In other cases, an internal line may be connected to a more sophisticated piece of equipment, such as an Ethernet router/hub or a dialup network terminal adapter, which may be capable of carrying a plurality of bandwidth channels to several of the just mentioned terminal devices.

Generally, the type of connection established between a terminal device and the external network through the switching unit is classifiable as being either a voice or a data connection. A voice connection is usually bidirectional and typically requires the establishment and continuous occupancy of a single circuit joining a bandwidth channel on an external line to a bandwidth channel on the internal line corresponding to the terminal device placing or receiving the call.

On the other hand, a data connection often consists of spurious, unidirectional exchanges of packets which occasionally requires the establishment of additional circuits or the removal of unused ones. Although there is a clear dichotomy between the constant bandwidth requirements of voice and the variable bandwidth requirements of packet-based data communications, both types of information must share the same amount of external network bandwidth available to the switching unit.

Moreover, it is recognized that real-time exchanges such as telephone conversations will generally have a higher priority than store-and-forward data transactions, e.g., E-mail messages. Thus, the nature and priority of a call (or call request) must be taken into account by any system which is to allow voice and data circuits to efficiently and equitably share the same "pool" of bandwidth channels carried by the external lines.

Currently, the most common form of bandwidth management uses line pool servers for allocating a fixed number of external bandwidth channels to voice and a fixed number of external bandwidth channels to data. While this allows a certain minimum number of connections (i.e., circuits) to be established for either type of information exchange, there will always exist conditions under which the fixed allocation will prove inefficient, either because unused data bandwidth channels are not being used for voice or because unused voice bandwidth channels are not being employed for data.

Furthermore, even when the available bandwidth channels carried by the external lines are allocated in a dynamic fashion by the line pool server, switching units employing this technique remain at a disadvantage when faced with a shortage of available bandwidth channels, since the line pool server is not designed to take into account the relative priorities of existing calls and newly made call requests. Clearly, such switching units suffer from being unable to tear down lower-priority connections in order to establish higher-priority connections in their stead.

SUMMARY OF THE INVENTION

It is an object of the present invention to mitigate or obviate one or more disadvantages of the prior art.

Therefore, the invention may be summarized according to a first broad aspect as a switching unit connectable to a plurality of external lines carrying a plurality of external bandwidth channels and also connectable to a plurality of internal lines carrying a plurality of internal bandwidth channels, the switch comprising: a plurality of internal interface units connectable to the internal lines, for receiving outgoing call requests associated with respective internal bandwidth channels; a control unit connected to the internal interface units, for receiving outgoing call requests from the internal interface units and generating respective updated circuit mappings therefrom; and a switch connected to the control unit and to the internal interface units and connectable to the external lines, for controllably establishing circuits between the external bandwidth channels and respective ones of the internal bandwidth channels in accordance with updated circuit mappings received from the control unit; wherein the control unit comprises means for, upon receiving an outgoing call request, determining whether there is an available external bandwidth channel and if so: generating an updated circuit mapping sent to the switch for establishing a circuit between the available external bandwidth channel and the internal bandwidth channel associated with said outgoing call request; otherwise: determining whether the outgoing call request has a higher priority than at least one currently established circuit and if so, generating an updated circuit mapping sent to the switch for interrupting a lower-priority circuit and establishing a new circuit between the external bandwidth channel formerly associated with the interrupted circuit and the internal bandwidth channel associated with said outgoing call request.

In a switching unit comprising a switch for controllably establishing circuits between a plurality of external bandwidth channels and respective ones of a plurality of internal bandwidth channels, the invention may be summarized according to a second broad aspect as a method of processing an outgoing call request associated with an internal bandwidth channel, said outgoing call request having a priority, the method comprising the steps of: determining whether there is an available external bandwidth channel and if so: establishing a circuit between the available external bandwidth channel and the internal bandwidth channel associated with said outgoing call request; otherwise: determining whether the outgoing call request has a higher priority than at least one currently established circuit and if so, interrupting a lower-priority circuit and establishing a new circuit between the external bandwidth channel formerly associated with the interrupted circuit and the internal bandwidth channel associated with said outgoing call request..

The invention may be summarized according to a third broad aspect as a computer-readable storage medium containing software which, when running on a processor in a switching unit for controllably establishing circuits between a plurality of external bandwidth channels and respective ones of a plurality of internal bandwidth channels, follows a sequence of steps to process an outgoing call request associate with an internal bandwidth channel and having a priority, the steps comprising: determining whether there is an available external bandwidth channel and if so: establishing a circuit between the available external bandwidth channel and the internal bandwidth channel associated with said outgoing call request; otherwise: determining whether the outgoing call request has a higher priority than at least one currently established circuit and if so, interrupting a lower-priority circuit and establishing a new circuit between the external bandwidth channel formerly associated with the interrupted circuit and the internal bandwidth channel associated with said outgoing call request.

According to a further broad aspect, the invention may be summarized as a switching unit connectable to at least one external line carrying a plurality external bandwidth channels and also connectable to at least one internal line carrying a plurality of internal bandwidth channels, the internal lines connected to terminal devices, the terminal devices associated with at least one of the plurality of internal bandwidth channels, the switch comprising: a plurality of external interface units connectable to the external lines, for receiving incoming call requests associated with the external bandwidth channels carried by the external lines; a control unit connected to the external interface units, for receiving incoming call requests from the external interface units and generating respective updated circuit mappings therefrom; and a switch connected to the control unit and to the external interface units and connectable to the internal lines, for controllably establishing circuits between the external bandwidth channels and respective ones of the internal bandwidth channels in accordance with updated circuit mappings received from the control unit; wherein the control unit comprises means for, upon receiving an incoming call request from an external interface unit, determining the destination terminal device and determining whether there is at least one available internal bandwidth channel associated with the destination terminal device and if so: if the external bandwidth channel carrying said incoming call request is available, generating an updated circuit mapping sent to the switch for establishing a circuit between an available internal bandwidth channel and the external bandwidth channel associated with said incoming call request; otherwise: determining whether the incoming call request has a higher priority than at least one circuit currently established with the destination terminal device and if so and also if the external bandwidth channel carrying said incoming call request is available, generating an updated circuit mapping sent to the switch for interrupting a lower-priority circuit occupying an internal bandwidth channel associated with the destination terminal device and establishing a new circuit between the internal bandwidth channel formerly associated with the interrupted circuit and the external bandwidth channel associated with said incoming call request.

In a switching unit comprising a switch for controllably establishing circuits between a plurality of external bandwidth channels and respective ones of a plurality of internal bandwidth channels, the invention may be summarized according to yet another broad aspect as a method of processing an incoming call request associated with an the external bandwidth channels, said incoming call request having a priority and associated with a destination terminal device and at least one internal bandwidth channel, the method comprising the steps of: determining whether there is at least one available internal bandwidth channel associated with the destination terminal device and if so: determining whether the external bandwidth channel carrying said incoming call request is available and if so, generating an updated circuit mapping sent to the switch for establishing a circuit between an available internal bandwidth channel and the external bandwidth channel associated with said incoming call request; otherwise: determining whether the incoming call request has a higher priority than at least one circuit currently established with the destination terminal device and if so, determining whether the external bandwidth channel carrying said incoming call request is available and if so, generating an updated circuit mapping sent to the switch for interrupting a lower-priority circuit occupying an internal bandwidth channel associated with the destination terminal device and establishing a new circuit between the internal bandwidth channel formerly associated with the interrupted circuit and the external bandwidth channel associated with said incoming call request.

The invention may be summarized according to still another broad aspect as a computer-readable storage medium containing software which, when running on a processor in a switching unit for controllably establishing circuits between a plurality of external bandwidth channels and respective ones of a plurality of internal bandwidth channels, follows a sequence of steps to process an incoming call request having a priority, the steps comprising: determining whether there is at least one available internal bandwidth channel associated with the destination terminal device and if so: determining whether the external bandwidth channel carrying said incoming call request is available and if so, generating an updated circuit mapping sent to the switch for establishing a circuit between an available internal bandwidth channel and the external bandwidth channel on which said incoming call request was received; otherwise: determining whether the incoming call request has a higher priority than at least one circuit currently established with the destination terminal device and if so, determining whether the external bandwidth channel carrying said incoming call request is available and if so, generating an updated circuit mapping sent to the switch for interrupting a lower-priority circuit occupying an internal bandwidth channel associated with the destination terminal device and establishing a new circuit between the internal bandwidth channel formerly associated with the interrupted circuit and the external bandwidth channel carrying said incoming call request.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1:
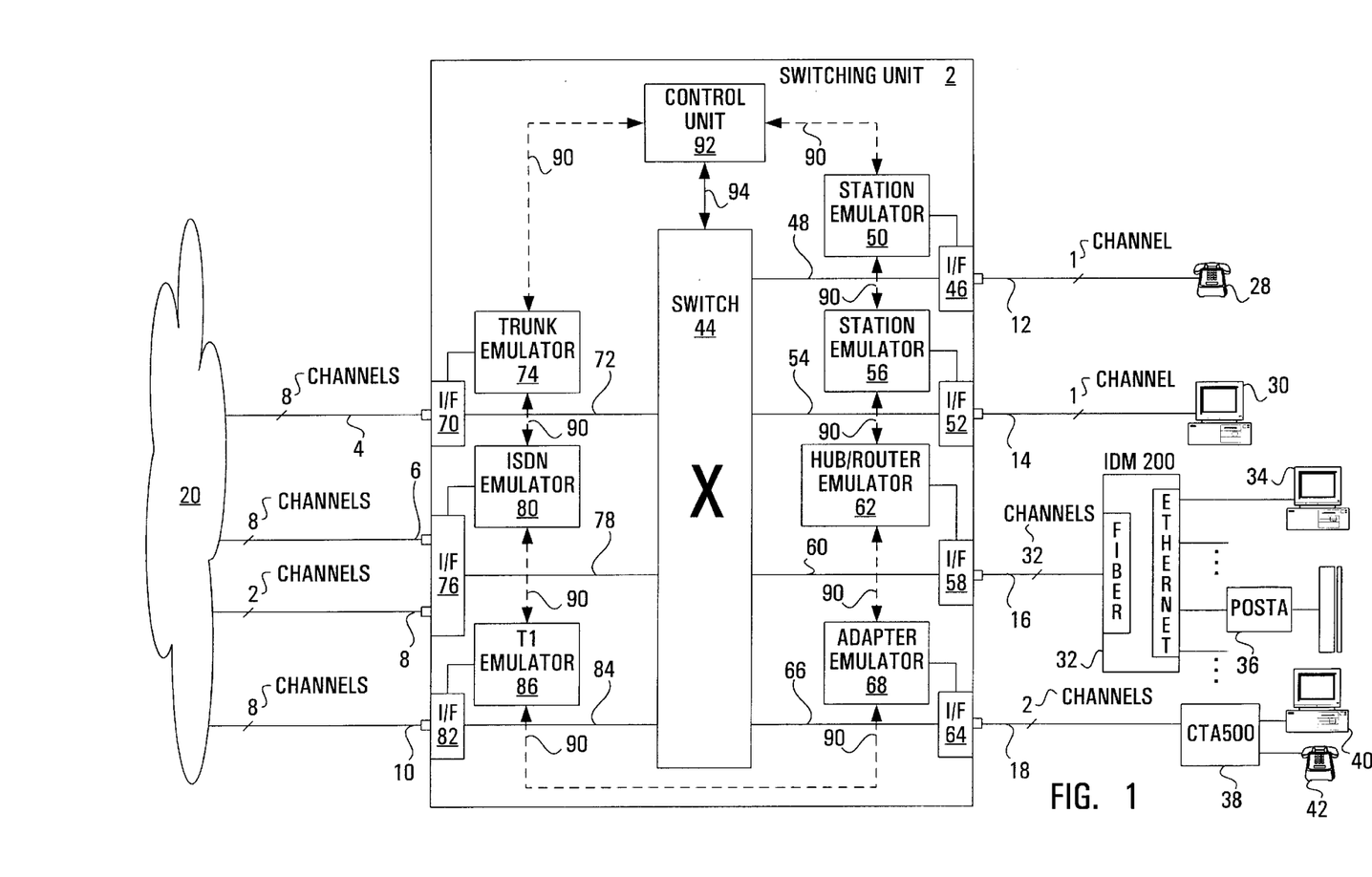
FIG. 1 is a block diagram of a switching unit in accordance with the present invention.

With reference to FIG. 1, there is shown in schematic form a switching unit 2 in accordance with the present invention, for establishing circuits between a total of 26 "external" bandwidth channels carried on external physical lines 4,6,8,10 and a total of 36 "internal" bandwidth channels carried on internal physical lines 12,14,16,18. As a matter of convention, information travelling from the external physical lines to the internal physical lines through the switching unit 2 is hereinafter said to travel in the "downstream" direction, while information flowing in the opposite direction is said to travel in the "upstream" direction.

The term "physical" is used throughout in order to distinguish the external and internal physical lines from logical interconnections. It should be understood that the communications medium used by the external and internal physical lines may consist of copper wire, coaxial cable or optical fiber or a line may be established using a wireless radio link.

The number of external and internal bandwidth channels and physical lines accommodated by the example switching unit in FIG. 1 has been chosen merely to emphasize the need for a switching unit and it should be apparent to those skilled in the art that the present invention is generally applicable to any number of external or internal bandwidth channels or physical lines. Depending on the actual number of bandwidth channels, the switching unit may be categorized as a key system unit (KSU) or as a private branch exchange (PBX). The switching unit could also be a personal computer or a PC or network server that provides switching functionality.

External physical lines 4,6,8,10 interface with a switched network 20, which may be the public switched telephone network (PSTN), a private network or a combination thereof. The switched network could also include IP based trunks which could be provided by an Internet Service Provider (ISP) or which may form part of a private network or a public IP network. External physical line 4, which is known in the art as an analog "trunk", carries eight analog "plain old telephone service" (POTS) bandwidth channels, external physical line 6 carries eight ISDN primary rate (ISDN-PR) digital bandwidth channels, external physical line 8 carries two ISDN basic rate (ISDN-BR) bandwidth channels and external physical line 10 carries eight so-called "T1" bandwidth channels.

FIG. 1 also illustrates various candidate devices which may terminate the internal physical lines 12,14,16,18. For instance, internal physical line 12 is shown connected directly to a digital telephone 28 for exchanging voice information using a single internal bandwidth channel. Similarly, internal physical line 14 carries packets of data on a single internal bandwidth channel to and from a computing device 30.

Other devices which are physically connected to the switching unit 2 take up more than one internal bandwidth channel. For example, thirty-two internal bandwidth channels are taken up by an integrated router/hub 32 connected to the switching unit 2 by internal physical line 16, in this case a fiber optic cable. An example of a router/hub 32 is Nortel's IDM200, which communicates with a plurality of personal computers 34, digital telephones (not shown) and/or point-of-sale terminal adapters 36 elsewhere in the business establishment via an appropriate protocol such as Ethernet.

FIG. 1 further shows the switching unit 2 connected via physical internal line 18 to a network terminal adapter 38, such as Nortel's CTA500, which takes up two internal bandwidth channels and dynamically allocates them between a personal computer 40 and a digital telephone 42. This type of device gives the end user a choice of using both bandwidth channels for a high-speed data transfer or to use one of them as a digital telephone (voice) connection and the other as a network connection.

Within the switching unit 2, internal physical line 12 is intercepted by an interface unit 46 connected to the switch matrix 44 via an intermediate internal line 48 and also connected to a station emulator 50. Interface unit 46 comprises circuitry for suitably formatting the upstream signal on internal physical line 12 so as to render the emergent upstream signal on intermediate internal line 48 acceptable to the switch matrix 44. Station interface unit 46 also comprises circuitry for decoding (but not necessarily interpreting) an outgoing call request contained in the upstream signal transmitted by the digital telephone 28 over internal physical line 12 and for sending the decoded outgoing call request to the station emulator 50. In addition, interface unit 46 comprises circuitry for receiving control messages from the station emulator 50 and for accordingly formatting the downstream signal on intermediate internal line 48 so that the emergent downstream signal on internal physical line 12 adheres to the protocol used by the digital telephone 28.

A similar interface unit 52 intercepts internal physical line 14 connected to the computing device 30. Interface unit 52 is connected to the switch matrix 44 via an intermediate internal line 54 and is also connected to a station emulator 56. Interface unit 52 also comprises circuitry for upstream and downstream formatting, in addition to circuitry for decoding an outgoing call request and sending it to station emulator 56, which is similar to station emulator 46. Indeed all the emulators to be described are similar in that they are preferably software entities having a memory and executing a series of instructions either on a respective dedicated processing unit or on a common processor in the switching unit 2.

Internal physical line 16, connected at one end to the router/hub 32, is connected at the switching unit 2 to an interface unit 58, itself connected to the switch matrix 44 via an intermediate internal line 60. Since the signal exchanged between the switching unit 2 and the router/hub 32 is optical in nature, interface unit 58 comprises circuitry for conversion of this signal from optical to electronic form (or vice versa), under control of a router/hub emulator 62 to which it is connected by a control line.

In addition, since the router/hub 32 is a relatively complex entity handling a large number of internal bandwidth channels, it may be necessary for interface unit 58 to comprise circuitry for supporting an additional optical control channel allowing the exchange of control parameters with the router/hub 32, such control parameters being interpreted and generated by router/hub emulator 62. The optical control channel may encapsulate outgoing call requests made by the terminal devices connected to the router/hub 32. The optical control channel may take up one or more of the internal bandwidth channels exchanged between the switching unit 2 and the router/hub 32.

Internal physical line 18, which is connected at one end to the network terminal adapter 38, is intercepted at the switching unit 2 by an interface unit 64 which is connected to the switch matrix 44 via an intermediate internal line 66. Interface unit 64 comprises circuitry for conditioning the upstream signal arriving on internal physical line 18 so as to provide an upstream signal on intermediate internal line 66 in a format accepted by the switch matrix 44.

In addition, interface unit 64 comprises circuitry for formatting the downstream signal arriving on intermediate internal line 66 so as to render the emergent downstream signal on internal physical line 18 acceptable to the network terminal adapter 38. Furthermore, interface unit 64 is connected to an adapter emulator 68 and also comprises decoding circuitry for decoding an outgoing call request generated by the devices connected to the network terminal adapter 38 and relayed by the latter to the adapter emulator 68.

External lines 4,6,8,10 are similarly connected to the switching unit 2 by corresponding interface units, which are also connected to the switch matrix and to corresponding emulators. Specifically, external physical line (or trunk) 4 is connected at the switching unit to an interface unit 70, which is connected to the switch matrix 44 via an intermediate external trunk 72.

Interface unit 70 comprises circuitry for formatting the analog upstream POTS signals on external trunk 4 into a digital format supported by the switch matrix 44 and vice versa. Formatting control is executed by a trunk emulator 74 connected to interface unit 70. Interface unit also comprises circuitry for decoding an incoming call request (which it sends to trunk emulator 74 for further processing) and for generation of a busy signal under control of trunk emulator 74.

External physical lines 6 and 8 are connected to separate ports of a common ISDN interface unit 76, which is then connected to the switch matrix 44 via an intermediate external line 78 carrying all 10 ISDN-type external bandwidth channels. Interface unit 76 is connected to an ISDN emulator 80 and comprises formatting circuitry in addition to circuitry for decoding an incoming call request associated with one of the external bandwidth channels carried by external physical lines 6,8 and communicating the call request 'to ISDN emulator 80. The incoming call requests usually arrive on a separate control channel (not included among the 8 primary rate and 2 basic rate bandwidth channels). Interface unit 76 also comprises circuitry for communicating control information with other elements in the switched network 20 via external physical lines 6,8.

External physical line 10 carrying Ti traffic on 8 external bandwidth channels is intercepted at the switching unit 2 by an interface unit 82, which is connected to the switch matrix 44 by an intermediate external line 84. Interface unit 82 comprises formatting circuitry as well as circuitry for decoding incoming call requests arriving on external physical line 10. Interface unit 82 is also connected to a T1 emulator 86, from which it derives formatting instructions and to which it provides decoded incoming call requests.

The switching unit 2 also comprises a control unit 92, preferably a micro-processor, a micro-controller or other type of programmable logic device, which is connected to the emulators 50,56,62,68,74,80,86, preferably via a software or hardware bus 90. The control unit 92 may occupy the same processor as the emulators 50,56,62,68,74,80,86. The control unit 92 is also connected to the switch matrix 44, preferably using a dedicated hardware link 94, although the switch matrix 44 is also implementable in software in which case link 94 would represent the exchange of software parameters between the control unit 92 and the switch matrix 44.

It is to be noted that outgoing call requests which are present in the signals carried on internal physical lines 12,14,16,18 and incoming call requests which are present in the signals carried on external physical lines 4,6,8,10 are captured by the corresponding interface units and emulators and therefore may not appear on the signals travelling on the corresponding intermediate lines. Nevertheless, the information content (e.g., voice or data) remains unaltered as it travels through the switching unit in either direction.

In operation, the control unit 92 receives parameters related to incoming and outgoing call requests from the various emulators, processes them and provides the switch matrix 44 with a dynamic circuit mapping for establishing one-to-one connections (i.e., circuits) between the various external and internal bandwidth channels. Each of three distinct scenarios is now discussed in further detail.

Outgoing Call Request

Figure 2:
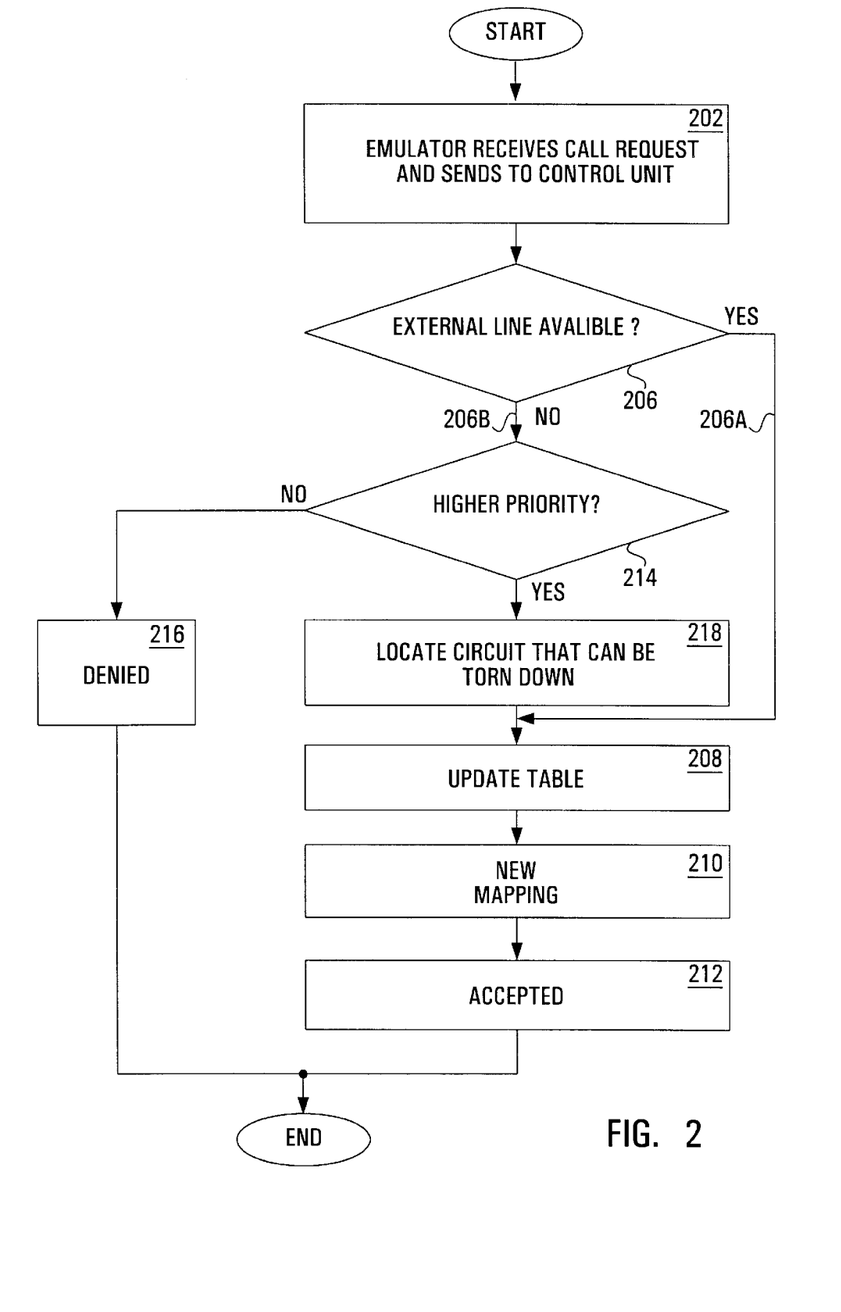
FIG. 2 is a flowchart illustrating an inventive procedure for processing an outgoing call request, as executed by the switching unit of FIG. 1.

The first scenario is one in which an outgoing call request is made by an originating terminal device and arrives at the switching unit 2 via the internal bandwidth channel corresponding to the originating terminal device. Reference is made to FIG. 2, which shows a sequence steps executed by the emulators and the control unit within the switching unit when handling outgoing call requests received by a digital telephone, computer terminal or other "originating terminal device" connected either directly or indirectly to the customer premises end of the switching unit.

STEP 202:

If the originating terminal device is connected directly to the switching unit 2, as is the case with terminal device 28 (or 30), then the outgoing call request is detected and decoded by the corresponding interface unit 46 (or 52), which sends the outgoing call request to the corresponding station emulator 50 (or 56).

On the other hand, if the originating terminal device interfaces through a multi-channel device, such as router/hub 32 or network terminal adapter 38, then the multi-channel device itself detects the outgoing call request and relays it to the corresponding interface unit 58 or 64 in a suitable format using, e.g., a control channel. The interface unit 58 (or 64) then decodes the outgoing call request and sends it to the corresponding emulator 62 (or 68).

A decoded outgoing call request comprises information relating to the priority of the call, which is most commonly an indication of the call type (voice or data), but which may be of a more complex nature. In addition, the outgoing call request may specify a desired "line pool" which indicates the pool of external physical lines, usually grouped according to line type (e.g., POTS analog, ISDN-PR, ISDN-BR, T1 digital, IP trunk) that should be used for establishing a connection in the region between the switching unit and the switched network 20.

The emulator receiving the outgoing call request from the originating terminal device then encapsulates the priority information and the desired line pool, if specified, into a message sent onto the bus 90 and destined for the control unit 92.

STEP 206:

The control unit 92, by virtue of being connected to the bus 90, subsequently receives the message sent in accordance with step 202 by an emulator and verifies whether an external bandwidth channel is available. If, in addition, a desired line pool is specified, then only those bandwidth channels carried by external lines within that pool (i.e., of the appropriate type) are searched for an available bandwidth channel.

Searching for an available external bandwidth channel can be done by the control unit 92 consulting a table stored in local memory, although it is to be understood that considerably more sophisticated algorithms could be used for this purpose. Nevertheless, the use of a table is assumed hereinbelow for the sake of simplicity. Furthermore, assuming the external and internal bandwidth channel configuration of FIG. 1 this table may have the form shown in FIG. 5.

Figure 5:
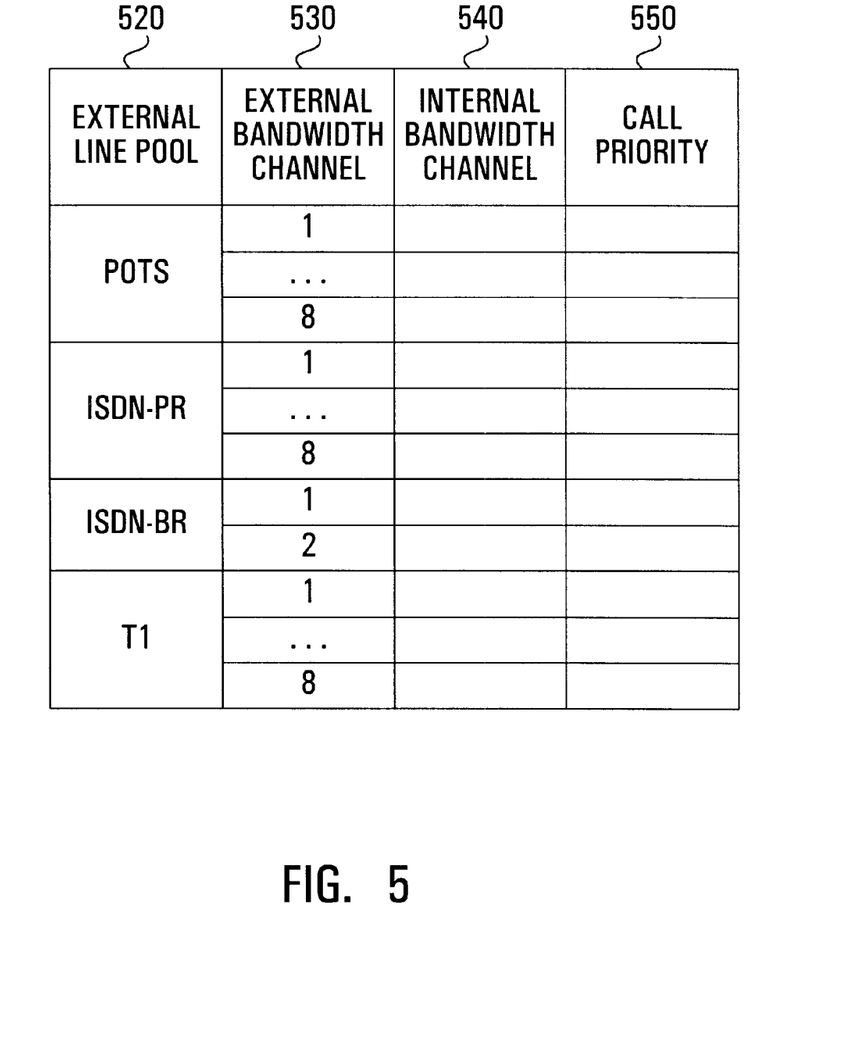
FIG. 5 shows the preferred arrangement of a table used to store information related to circuits established by the switching unit of FIG. 1.

With reference to FIG. 5, each row in the table has a plurality of fields, including an "external line pool" field 520, an "external bandwidth channel" field 530, an "internal bandwidth channel" field 540 and a "call priority" field 540. The number of rows corresponds to the total number of external bandwidth channels and therefore in the case of the arrangement of FIG. 1, the corresponding table would have twenty-six rows.

In a given row, the "external bandwidth channel" field 530 identifies the corresponding external bandwidth channel by means of, e.g., a number, while the "external line pool" field 520 indicates the type of external physical line associated with that external bandwidth channel and is meaningful only when the desired line pool accompanies an outgoing call request. In general, the "external bandwidth channel" field 530 and the "external line pool" field 520 can be fixed, although they would be modified for different switched networks 20 interfacing with the switching unit 2.

When a circuit is established between an external bandwidth channel and internal bandwidth channel, then an identification of the internal bandwidth channel is inserted into the "internal bandwidth channel" field 540 of the row corresponding to the external bandwidth channel. Finally, the "call priority" field 550, which is valid for a given row of the table only when a circuit is in existence between the corresponding external bandwidth channel and a certain internal bandwidth channel, indicates the priority of the circuit thereby established.

Therefore, upon consulting a table of the form shown in FIG. 5, it is possible for the control unit 92 to determine whether or not an external bandwidth channel is available (in the desired line pool, when specified) simply by verifying occupancy of the "internal bandwidth channel" field in each row of the table. If the control unit 92 indeed finds an available external bandwidth channel, then this external bandwidth channel is identified and path 206A is followed to STEP 208; otherwise path 206B is followed to STEP 214.

STEP 208:

In this case, a circuit can be established between the internal bandwidth channel corresponding to the originating terminal device and the available external bandwidth channel identified in STEP 206. Firstly, the control unit 92 updates the row corresponding to the available external bandwidth channel by entering an internal bandwidth channel identifier in the "internal bandwidth channel" field 540 and by entering the call priority in the "call priority" field 550. The inventive procedure then advances to STEP 210.

STEP 210:

Having updated its internal table, the control unit 92 sends a message to the switch matrix 44 via the dedicated link 94, containing an updated circuit mapping for the switch matrix 44. The updated circuit mapping need not comprise all the elements of the locally stored table. For example, when a new circuit is established, only the participating external and internal bandwidth channels need be specified to the switch matrix 44. (In addition, as will be seen later, the switch matrix 44 may be forced to interrupt an existing circuit, in which case the control unit 92 would specify the external and internal bandwidth channels corresponding to the circuit that is to be torn down.)

The switch matrix 44 then receives the updated circuit mapping and establishes (and, if applicable, interrupts) the circuit(s) as specified in the updated circuit mapping.

STEP 212:

After the switch matrix 44 establishes (and, if applicable, tears down) the circuit(s) specified in the updated circuit mapping, the control unit 92 sends an acceptance message out onto the bus 90. This message identifies the internal and external bandwidth channels that form the newly established circuit and, if applicable, those formerly comprising a circuit that has been torn down. The acceptance message is destined for the emulator associated with the originating terminal device as well as for the emulator associated with the external line carrying the now occupied (formerly available) external bandwidth channel.

The emulator associated with the now occupied external bandwidth channel receives the acceptance message and, in the case of an ISDN bandwidth channel, the emulator reacts by appending control information such as the call priority to the ISDN primary or basic rate signal leaving the switching unit 2 and headed for the switched network 20.

The emulator associated with the internal bandwidth channel corresponding to the originating terminal device also receives the acceptance message and if the originating terminal device is separated from the switching unit 2 by an intermediate multi-channel device (such as router/hub 32 or network terminal adapter 38), then the emulator notifies the intermediate device of successful call placement via the respective interface unit (58 or 64). The router/hub 32 or network terminal adapter 38 itself then performs the necessary remaining operations in order to allow the originating terminal device to begin communicating information through the switching unit.

STEP 214:

It is recalled that this step is entered when no external bandwidth channel (in the desired line pool, when specified) is available. In this case, the control unit 92 must verify whether or not the outgoing call request has a higher priority than any one of the calls currently in progress and occupying the external bandwidth channels (in the desired line pool, when specified). When using a locally stored table as previously described, this can be achieved by comparing the call priority of the outgoing call request with the "call priority" field in each row of the table.

If it is found that the outgoing call request has a higher priority than at least one of the calls currently in progress, then STEP 218 is to be followed; otherwise the inventive method proceeds with STEP 216.

STEP 216:

Because the outgoing call request has a lower priority, the request is denied, and this is indicated by the control unit 92 sending a denial message on the bus 90 which is received by the emulator associated with the originating terminal device. The emulator will either command the corresponding interface unit to send a connection rejection or connection denial signal (e.g. a busy signal) to the originating terminal device or, if the emulator is connected to an intermediate device (e.g., router/hub 32 or adapter 38), it will indicate to the intermediate device that the requested call cannot be placed, resulting in termination of the inventive procedure.

STEP 218:

This step consists of the control unit 92 locating an established circuit that can be torn down in order to allow placement of the requested call. There are various ways of selecting the circuit to be torn down, of which three are now discussed. First, the control unit 92 itself may make the decision as to which circuit is to be torn down. If an internally stored table such as that in FIG. 5 is employed, then the circuit to be torn down is chosen in accordance with the lowest value in the "call priority" field among all rows. Alternatively, a "least-used" or "last-used" algorithm can be implemented by the control unit 92.

While this first, centralized approach is simple and effective, it is not necessarily efficient when there are existing circuits established with terminal devices connected to the switching unit via intermediate multi-channel devices (e.g., router/hub 32 or network terminal adapter 38). In this case, a second method may be used, whereby the control unit 92 instructs the intermediate device (via the associated emulator and interface unit) to drop one of its existing connections. This allows the intermediate device to intelligently designate the connection to be dropped, which might be capable of mitigating the effects of a reduction in bandwidth available to other, currently occupied terminal devices.

However, in the event that a satisfactory selection cannot be made, the intermediate device would nevertheless be forced to select a circuit that will be interrupted. The third option therefore consists of the corresponding emulator asking the intermediate device whether it is capable of dropping a circuit without adversely affecting system performance. If the third approach is taken, then the intermediate device would require modifications in order to enable it to accept the query from the emulator in the switching unit, to process the query and to respond to it.

In any event, once the control unit 92 determines the external bandwidth channel corresponding to the circuit which is to be torn down. This external bandwidth channel is deemed "available" and the inventive method executes STEP 208, STEP 210 and STEP 212 in the manner described above.

Incoming Call Request—External Bandwidth Channel Available

Also within the scope of the present invention is the processing of "incoming" call requests received from the switched network 20 on the bandwidth channels carried by external lines 4,6,8,10, each such call request identifying a destination terminal device.

Figure 3:
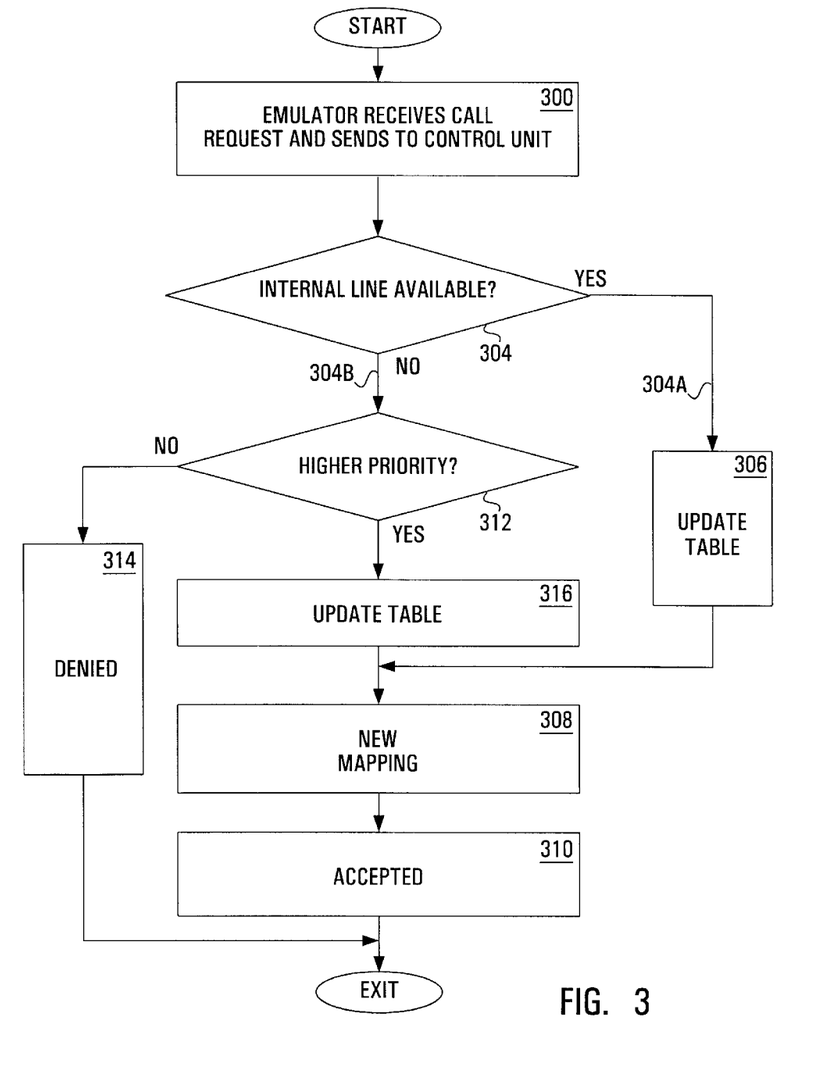
FIG. 3 is a flowchart illustrating an inventive procedure for processing an incoming call request, as executed by the switching unit of FIG. 1 when the external bandwidth channel associated with the call request is available.

Reference is now made to FIG. 3, which reveals the steps in an inventive bandwidth management procedure executed by the emulators and control unit within the switching unit each time an incoming call request identifying a destination terminal device is received from the switched network 20 on one of the external bandwidth channels when such bandwidth channel is free (i.e., unoccupied).

STEP 300:

An incoming call request arriving on an external bandwidth channel is decoded by the corresponding interface unit and sent to the corresponding emulator, which then relays the incoming call request onto the bus 90.

STEP 304:

The control unit 92, being connected to the bus 90, subsequently receives the message sent in STEP 300, determines the priority of the incoming call request and verifies whether an internal bandwidth channel corresponding to the destination terminal device is free. If a table such as that shown in FIG. 5 is used, then occupancy of the internal bandwidth channels can be determined by checking for the presence of the internal bandwidth channel identifiers associated with the destination terminal device in the "internal bandwidth channel" field for some row in the table.

If the control unit 92 finds that one or more internal bandwidth channels corresponding to the destination terminal device are free, then path 304A is followed to STEP 306; otherwise path 304B is followed to STEP 312.

STEP 306:

At this stage, a circuit can be established immediately between the external bandwidth channel carrying the incoming call request and an internal bandwidth channel associated with the destination terminal device. The control unit 92 stores the identifier of the chosen internal bandwidth channel in the "internal bandwidth channel" field of the row corresponding to the external bandwidth channel providing the incoming call request. The priority of the incoming call request, soon to become an established circuit, is entered in the "call priority" field of the corresponding row and the inventive procedure advances to STEP 308.

STEP 308:

Having updated its locally stored table, the control unit 92 sends a message to the switch matrix 44 via the dedicated link 94, the message containing an updated circuit mapping for the switch matrix 44. The updated circuit mapping specifies the internal and external bandwidth channels of the circuit to be established. (As will be shown later, the updated circuit mapping may also specify a circuit to be torn down.) Upon receipt of the updated mapping, the switch matrix 44 establishes (and possibly interrupts) the specified circuit or circuits. The inventive procedure continues with STEP 310.

STEP 310:

After the switch matrix 44 establishes (and possibly interrupts) the specified circuit(s), the control unit 92 sends an acceptance message onto the bus 90 destined for the emulator associated with the external bandwidth channel providing the incoming call request. This message contains an indication that the call request has been accepted, i.e., that a circuit between the internal bandwidth channel corresponding to the destination terminal device and the external bandwidth channel providing the incoming call request has been successfully established.

With reference to FIG. 1, if the destination terminal device is connected to interface unit 46 or 52, then upon receipt of the acceptance message, the corresponding station emulator (50 or 56) will send a message to the interface unit instructing it to provide a call indication signal on the bandwidth channel corresponding to the destination terminal device.

However, if the destination terminal device is 25 separated from the switching unit by an intermediate multi-channel device (such as the router/hub 32 or adapter 38), then the corresponding emulator notifies the intermediate device of successful call placement via the respective interface unit. It is then up to the intermediate device itself to perform any remaining operations in order to allow the destination terminal device to communicate information through the switching unit.

The emulator associated with the external bandwidth channel that provides the incoming call request may, in the case of ISDN, append an indication of successful call placement to the ISDN primary or basic rate signal leaving the switching unit 2 and headed for the switched network 20.

STEP 312:

Recalling that this step is executed when it is determined that all the internal bandwidth channels corresponding to the destination terminal device are occupied, the control unit 92 must verify whether or not the incoming call request has a higher priority than any call that has already been established with the destination terminal device. If a table such as that shown in FIG. 5 is used, then the priority of the incoming call request is compared to the value in the "call priority" field of the row corresponding to the external bandwidth channel(s) forming part of a circuit with the destination terminal device.

If it is found that the requested call has a higher priority than any of the circuits currently engaging the destination terminal device, then STEP 316 is followed. However, in the case of the incoming call request having a lower priority than one of the current calls in progress, STEP 314 is to be followed.

STEP 314:

The incoming call request is denied, as indicated by a message sent on the bus 90 by the control unit 92. This message is received by the emulator associated with the external bandwidth channel providing the incoming call request, which will order the corresponding interface unit to send a connection rejection or connection denial signal (e.g., a busy signal) back to the switched network 20, thus terminating the inventive procedure for this incoming call request.

STEP 316:

This step is essentially identical to step 306, except that a current circuit involving the destination terminal device is torn down. This additional stage involves erasing the "internal bandwidth channel" field and the "call priority" field of the row corresponding to the external bandwidth channel formerly communicating with the destination terminal device.

Steps 308 and 310 are then executed in the manner described above, wherein the control unit 92 sends an updated circuit mapping to the switch matrix 44, followed by the switch matrix 44 consequently tearing down an existing circuit and establishing a new one.

Incoming Call Request—External Bandwidth Channel Occupied

The present invention also provides for processing of an incoming call request that arrives on an external bandwidth channels which is occupied. A method of processing such an incoming call request is now described with reference to the flowchart in FIG. 4. For the sake of simplicity, it is assumed that only one internal bandwidth channel is associated with each terminal device, although it will be understood that multiple circuits could be established with each device.

Figure 4:
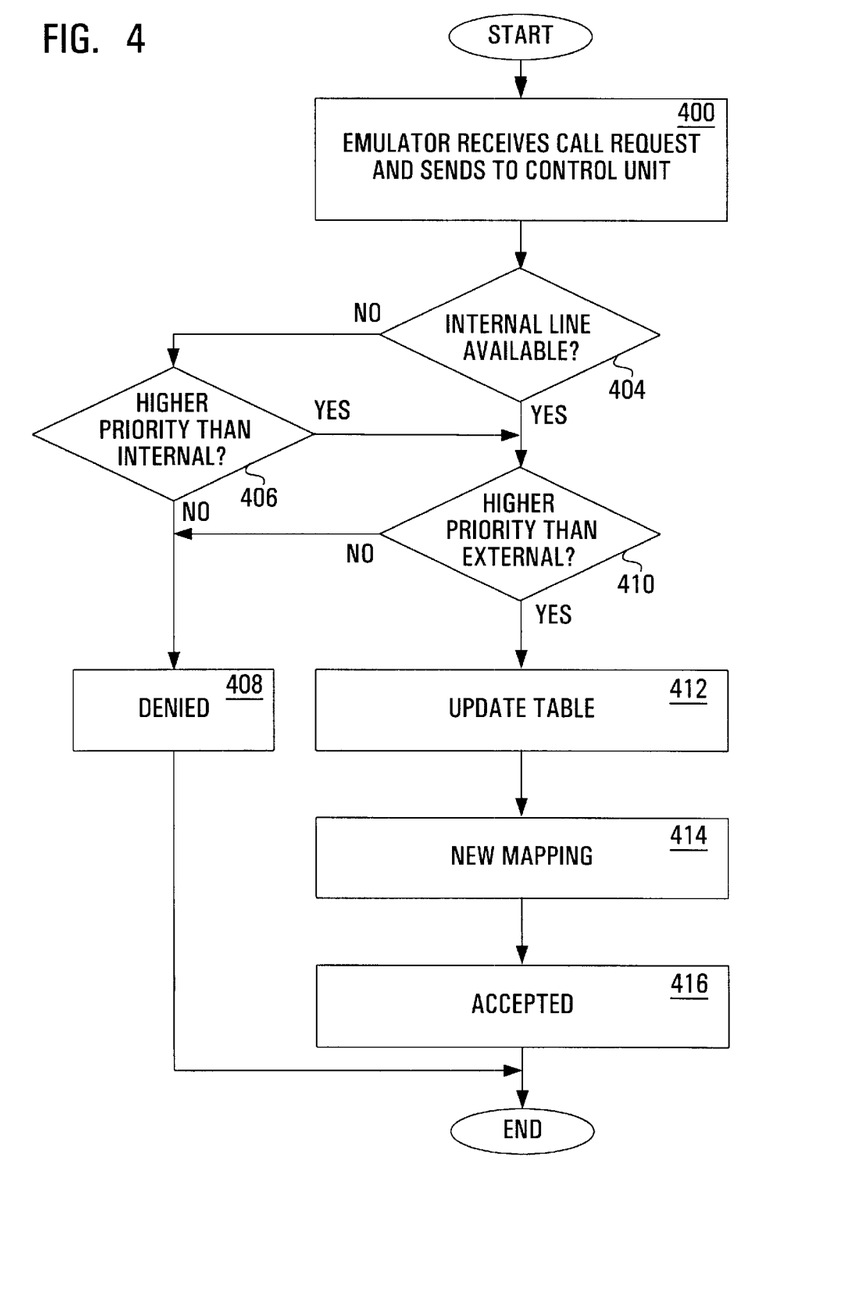
FIG. 4 is a flowchart illustrating an inventive procedure for processing an incoming call request, as executed by the switching unit of FIG. 1 when the external bandwidth channel associated with the call request is occupied.

STEP 400:

An incoming call request arriving on an external bandwidth channel is decoded by the corresponding interface unit and sent to the corresponding emulator, which then relays the incoming call request to onto the bus 90.

STEP 404:

The control unit 92 receives the message sent in STEP 400, determines the priority of the incoming call request and verifies whether the internal bandwidth channel corresponding to the destination terminal device is free. If a table such as that shown in FIG. 5 is used, then occupancy of the internal bandwidth channel can be determined by checking for the presence of the internal bandwidth channel identifier in the "internal bandwidth channel" field for some row in the table.

If the control unit 92 finds that the internal bandwidth channel corresponding to the destination terminal device is free, then the inventive procedure continues with STEP 410; otherwise STEP 406 is followed.

STEP 406:

Since the internal bandwidth channel is not available, it must be determined whether or not the incoming call request has a higher priority that the circuit which has already been established with the destination terminal device. IF a table such as that shown in FIG. 5 is used, then the priority incoming call request is compared to the value in the "call priority" field of the row corresponding to the external bandwidth channel currently communicating with the destination terminal device.

If it is found that the requested call has a higher priority than the call currently in progress, then STEP 410 is followed; otherwise, the call is denied STEP 408 is followed.

STEP 408:

The incoming call request is denied, as indicated by a message sent on the bus 90 by the control unit 92. This message is received by the emulator associated with the external bandwidth channel providing the incoming call request. which will order the corresponding interface unit to send a connection rejection or connection denial signal (e.g., a busy signal) back to the switched network 20, thus terminating the inventive procedure for this incoming call request.

STEP 410:

At this stage, the control unit 92 determines whether the external bandwidth channel carrying the incoming call request can be liberated. This is done based on the priority of the incoming call request and that of the circuit established with the external bandwidth channel providing the request. If a table such as that shown in FIG. 5 is used, then the "call priority" column will contain the priority information necessary for this comparison operation. If the incoming call request has a higher priority, then STEP 412 is followed; otherwise, the call must be denied and STEP 408 is followed in the previously described manner.

STEP 412:

The control unit must now tear down either one or two circuits, depending on the result of STEP 406 and STEP 410, in order to establish the connection between the external bandwidth channel carrying the incoming call request and internal bandwidth channel associated with the destination terminal device.

If a table such as that shown in FIG. 5 is used, then the "internal bandwidth channel" field currently containing the identification of the internal bandwidth channel associated with the destination terminal device is erased and the "internal bandwidth channel" field of the external bandwidth channel providing the incoming call request is filled with the identification of the internal bandwidth channel associated with the destination terminal device.

STEP 414:

Having updated its locally stored table, the control unit 92 sends a message to the switch matrix 44 via the dedicated link, the message containing an updated circuit mapping for the switch matrix 44. The updated circuit mapping specifies the internal and external bandwidth channels corresponding to the circuit that needs to be torn down and to the circuit that needs to be set up.

STEP 416:

After the switch matrix 44 performs the required changes to the mapping, the control unit 92 sends an acceptance message onto the bus 90 destined for the emulator associated with the external bandwidth channel providing the incoming call request. This message contains an indication that the call request has been accepted and that the former call has been torn down.

It is to be understood that in any case where a circuit has been torn down in favour of establishing a higher priority circuit subsequent to an incoming or outgoing call request, the internal devices which had their lower priority call interrupted may attempt to re-acquire the lost bandwidth on a periodic basis. This can be achieved by placing periodic outgoing call requests at intervals which may be based on a timer value (possibly administrable) which is long enough to allow the new higher priority call to get established.

While the preferred embodiment of the present invention has been described and illustrated, it will be apparent to one skilled in the art that numerous modifications and variations are possible. The scope of the invention is therefore only to be limited by the claims appended hereto.

We claim:

1. A switching unit connectable to a plurality of external lines carrying a plurality of external bandwidth channels and also connectable to a plurality of internal lines carrying a plurality of internal bandwidth channels, the switch comprising:

a plurality of internal interface units connectable to the internal lines, for receiving outgoing call requests associated with respective internal bandwidth channels;

a control unit connected to the internal interface units, for receiving outgoing call requests from the internal interface units and generating respective updated circuit mappings therefrom; and a switch connected to the control unit and to the internal interface units and connectable to the external lines, for controllably establishing circuits between the external bandwidth channels and respective ones of the internal bandwidth channels in accordance with updated circuit mappings received from the control unit;

wherein the control unit comprises means for, upon receiving an outgoing call request, determining whether there is an available external bandwidth channel and if so: generating an updated circuit mapping sent to the switch for establishing a circuit between the available external bandwidth channel and the internal bandwidth channel associated with said outgoing call request;

otherwise: determining whether the outgoing call request has a higher priority than at least one currently established circuit and if so, generating an updated circuit mapping sent to the switch for interrupting a lower-priority circuit and establishing a new circuit between the external bandwidth channel formerly associated with the interrupted circuit and the internal bandwidth channel associated with said outgoing call request.

2. A switching unit according to claim 1, wherein the switch is a digital switch matrix.

3. A switching unit according to claim 1, wherein the internal interface units comprise circuitry for formatting signals leaving or entering the switching unit on the internal lines.

4. A switching unit according to claim 1, further comprising a plurality of external interface units connectable to the external lines and connected to the control unit and to the switch, for formatting the signals leaving or entering the switching unit on the external lines.

5. A switching unit according to claim 1, further comprising a plurality of emulators connected between the control unit and respective internal interface units, wherein each emulator comprises means for receiving and processing an outgoing call request from the respective internal interface, thereby to extract the priority of the outgoing call request.

6. A switching unit according to claim 5, wherein the control unit and emulators are interconnected in a hardware bus architecture.

7. A switching unit according to claim 5, wherein the control unit and emulators are implemented in software and communicate through the exchange software parameters.

8. A switching unit according to claim 1, wherein the control unit communicates with the switch using a dedicated hardware link.

9. A switching unit according to claim 6, wherein the switch is also interconnected via the hardware bus architecture.

10. A switching unit according to claim 7, wherein the switch is also implemented in software and communicates via the exchange of software parameters.

11. A switching unit according to claim 1, wherein the control unit is a processor comprising a table stored in memory, said table containing a record of the external bandwidth channel, the internal bandwidth channel and the priority associated with each established circuit.

12. A switching unit according to claim 1, wherein the internal bandwidth channels carry a mixture of voice and data traffic.

13. A switching unit according to claim 12, wherein voice is considered to have a higher priority than data.

14. A switching unit according to claim 12, wherein data is said to have a higher priority than voice.

15. In a switching unit comprising a switch for controllably establishing circuits between a plurality of external bandwidth channels and respective ones of a plurality of internal bandwidth channels, a method of processing an outgoing call request associated with an internal bandwidth channel, said outgoing call request having a priority, the method comprising the steps of:

determining whether there is an available external bandwidth channel and if so: establishing a circuit between the available external bandwidth channel and the internal bandwidth channel associated with said outgoing call request;

otherwise: determining whether the outgoing call request has a higher priority than at least one currently established circuit and if so, interrupting a lower-priority circuit and establishing a new circuit between the external bandwidth channel formerly associated with the interrupted circuit and the internal bandwidth channel associated with said outgoing call request.

16. A computer-readable storage medium containing software which, when running on a processor in a switching unit for controllably establishing circuits between a plurality of external bandwidth channels and respective ones of a plurality of internal bandwidth channels, follows a sequence of steps to process an outgoing call request associate with an internal bandwidth channel and having a priority, the steps comprising:

determining whether there is an available external bandwidth channel and if so: establishing a circuit between the available external bandwidth channel and the internal bandwidth channel associated with said outgoing call request;

otherwise: determining whether the outgoing call request has a higher priority than at least one currently established circuit and if so, interrupting a lower-priority circuit and establishing a new circuit between the external bandwidth channel formerly associated with the interrupted circuit and the internal bandwidth channel associated with said outgoing call request.

17. A switching unit connectable to at least one external line carrying a plurality external bandwidth channels and also connectable to at least one internal line carrying a plurality of internal bandwidth channels, the internal lines connected to terminal devices, the terminal devices associated with at least one of the plurality of internal bandwidth channels, the switch comprising:

a plurality of external interface units connectable to the external lines, for receiving incoming call requests associated with the external bandwidth channels carried by the external lines;

a control unit connected to the external interface units, for receiving incoming call requests from the external interface units and generating respective updated circuit mappings therefrom; and a switch connected to the control unit and to the external interface units and connectable to the internal lines, for controllably establishing circuits between the external bandwidth channels and respective ones of the internal bandwidth channels in accordance with updated circuit mappings received from the control unit;

wherein the control unit comprises means for, upon receiving an incoming call request from an external interface unit, determining the destination terminal device and determining whether there is at least one available internal bandwidth channel associated with the destination terminal device and if so: if the external bandwidth channel carrying said incoming call request is available, generating an updated circuit mapping sent to the switch for establishing a circuit between an available internal bandwidth channel and the external bandwidth channel associated with said incoming call request;

otherwise: determining whether the incoming call request has a higher priority than at least one circuit currently established with the destination terminal device and if so and also if the external bandwidth channel carrying said incoming call request is available, generating an updated circuit mapping sent to the switch for interrupting a lower-priority circuit occupying an internal bandwidth channel associated with the destination terminal device and establishing a new circuit between the internal bandwidth channel formerly associated with the interrupted circuit and the external bandwidth channel associated with said incoming call request.

18. A switching unit according to claim 17, wherein the control unit further comprises means for:

if the external bandwidth channel associated with said incoming call request is occupied, determining whether the incoming call request has a higher priority than the circuit occupying the external bandwidth channel associated with said incoming call request and if not, generating an updated circuit mapping sent to the switch for interrupting a lower-priority circuit occupying an internal bandwidth channel associated with the destination terminal device, interrupting the circuit occupying the external bandwidth channel carrying the incoming call request and establishing a new circuit between the internal bandwidth channel formerly associated with the interrupted lower-priority circuit and the external bandwidth channel associated with said incoming call request.

19. In a switching unit comprising a switch for controllably establishing circuits between a plurality of external bandwidth channels and respective ones of a plurality of internal bandwidth channels, a method of processing an incoming call request associated with an the external bandwidth channels, said incoming call request having a priority and associated with a destination terminal device and at least one internal bandwidth channel, the method comprising the steps of:

determining whether there is at least one available internal bandwidth channel associated with the destination terminal device and if so: determining whether the external bandwidth channel carrying said incoming call request is available and if so, generating an updated circuit mapping sent to the switch for establishing a circuit between an available internal bandwidth channel and the external bandwidth channel associated with said incoming call request;

otherwise: determining whether the incoming call request has a higher priority than at least one circuit currently established with the destination terminal device and if so, determining whether the external bandwidth channel carrying said incoming call request is available and if so, generating an updated circuit mapping sent to the switch for interrupting a lower-priority circuit occupying an internal bandwidth channel associated with the destination terminal device and establishing a new circuit between the internal bandwidth channel formerly associated with the interrupted circuit and the external bandwidth channel associated with said incoming call request.

20. A method according to claim 19, further comprising the step of:

if the external bandwidth channel associated with said incoming call request is occupied, the control unit determining whether the incoming call request has a higher priority than the circuit occupying the external bandwidth channel associated with said incoming call request and if not, generating an updated circuit mapping sent to the switch for interrupting a lower-priority circuit occupying an internal bandwidth channel associated with the destination terminal device, interrupting the circuit occupying the external bandwidth channel carrying the incoming call request and establishing a new circuit between the internal bandwidth channel formerly associated with the interrupted lower-priority circuit and the external bandwidth channel associated with said incoming call request.

21. A computer-readable storage medium containing software which, when running on a processor in a switching unit for controllably establishing circuits between a plurality of external bandwidth channels and respective ones of a plurality of internal bandwidth channels, follows a sequence of steps to process an incoming call request having a priority, the steps comprising:

determining whether there is at least one available internal bandwidth channel associated with the destination terminal device and if so: determining whether the external bandwidth channel carrying said incoming call request is available and if so, generating an updated circuit mapping sent to the switch for establishing a circuit between an available internal bandwidth channel and the external bandwidth channel on which said incoming call request was received;

otherwise: determining whether the incoming call request has a higher priority than at least one circuit currently established with the destination terminal device and if so, determining whether the external bandwidth channel carrying said incoming call request is available and if so, generating an updated circuit mapping sent to the switch for interrupting a lower-priority circuit occupy ing an internal bandwidth channel associated with the destination terminal device and establishing a new circuit between the internal bandwidth channel formerly associated with the interrupted circuit and the external bandwidth channel carrying said incoming call request.

22. A computer-readable storage medium according to claim 21, wherein the sequence of steps further comprises the step of:

if the external bandwidth channel associated with said incoming call request is occupied, determining whether the incoming call request has a higher priority than the circuit occupying the external bandwidth channel associated with said incoming call request and if not, generating an updated circuit mapping sent to the switch for interrupting a lower-priority circuit occupying an internal bandwidth channel associated with the destination terminal device, interrupting the circuit occupying the external bandwidth channel carrying the incoming call request and establishing a new circuit between the internal bandwidth channel formerly associated with the interrupted lower-priority circuit and the external bandwidth channel associated with said incoming call request.

\* \* \* \* \*